(12) United States Patent
Tseng et al.

(10) Patent No.: US 9,348,461 B2
(45) Date of Patent: May 24, 2016

(54) INPUT SYSTEM

(71) Applicant: Primax Electronics Ltd., Neihu, Taipei (TW)

(72) Inventors: Ying-Che Tseng, Taipei (TW); Tung-Heng Wu, Taipei (TW)

(73) Assignee: PRIMAX ELECTRONICS LTD., Neihu (TW)

( * ) Notice: Subject to any disclaimer, the term of this patent is extended or adjusted under 35 U.S.C. 154(b) by 0 days.

(21) Appl. No.: 14/557,166

(22) Filed: Dec. 1, 2014

(65) Prior Publication Data

US 2016/0098112 A1  Apr. 7, 2016

(30) Foreign Application Priority Data

Oct. 3, 2014  (TW) .............................. 103134631 A

(51) Int. Cl.
*G09G 5/00* (2006.01)
*G06F 3/042* (2006.01)

(52) U.S. Cl.
CPC ...... *G06F 3/042* (2013.01); *G06F 2203/04101* (2013.01); *G06F 2203/04106* (2013.01)

(58) Field of Classification Search
CPC ..... G06F 3/042; G06F 3/04883; G06F 3/041; G06F 3/017; G06F 2203/04101; G06F 2203/04106

USPC ............ 345/156, 173–175; 455/556.1, 556.2, 455/566
See application file for complete search history.

(56) References Cited

U.S. PATENT DOCUMENTS

| | | | | |
|---|---|---|---|---|
| 2012/0249443 | A1* | 10/2012 | Anderson | A63F 13/06 345/173 |
| 2013/0222239 | A1* | 8/2013 | Galor | G06F 3/0481 345/157 |
| 2015/0042580 | A1* | 2/2015 | Shim | G06F 3/017 345/173 |

* cited by examiner

*Primary Examiner* — Jennifer Nguyen
(74) *Attorney, Agent, or Firm* — Kirton McConkie; Evan R. Witt

(57) ABSTRACT

An input system includes an electronic device and a touchpad device. When the application program installed in the electronic device is activated, a target object is displayed on a display screen of the electronic device. A projection device of the touchpad device generates an object projection image of the target object. When the user moves the object projection image with the hand, the touchpad device detects a moving trajectory of the hand and generates the moved object projection image. Consequently, the target object shown on the electronic device is synchronously moved with the object projection image.

10 Claims, 6 Drawing Sheets

INPUT SYSTEM

FIELD OF THE INVENTION

The present invention relates to an input system, and more particularly to an input system with an electronic device and a touchpad device.

BACKGROUND OF THE INVENTION

The widely-used peripheral input device of a computer system comprises for example a mouse device, a keyboard device, a trackball device, or the like. With the progress of the times, a touch input device has been introduced into the market. By directly using the user's finger or a stylus to operate the touch input device, the computer system or a similar electronic device can be correspondingly controlled.

The applications of the touch input device are very extensive. For example, a touchpad device may be installed on a notebook computer. By operating the touchpad device, the movement of a cursor may be controlled or a corresponding icon of a user interface may be clicked without the need of using a mouse to operate the notebook computer. In accordance with an advantage of the touchpad device, the touchpad device can be intuitively operated by the user and thus various commands can be correspondingly executed. However, since the conventional touchpad device is mainly used to provide a two-dimensional control mechanism, the applications of the touchpad device are restricted.

Therefore, there is a need of providing an improved touchpad device with more extensive applications.

SUMMARY OF THE INVENTION

An object of the present invention provides an input system with a touchpad device for controlling a three-dimensional motion.

In accordance with an aspect of the present invention, there is provided an input system. The input system includes an electronic device and a touchpad device. An application program is installed in the electronic device. When the application program is activated, a target object is displayed on a display screen of the electronic device. The electronic device generates a spatial information of the target object. The touchpad device is connected with the electronic device, and receives the spatial information of the target object. The touchpad device generates an object projection image of the target object according to the spatial information. The touchpad device includes a first projecting device, a second projecting device, an airflow sensor and a controlling unit. The first projecting device is disposed on a top surface of the touchpad device and located at a first side of the touchpad device. The first projecting device generates a first projection image according to the spatial information. Moreover, the first projecting device generates a first optical signal according to a hand operation of a user on the object projection image. The second projecting device is disposed on the top surface of the touchpad device and located at a second side of the touchpad device. The second projecting device generates a second projection image according to the spatial information. Moreover, the second projecting device generates a second optical signal according to the hand operation. The first projection image and the second projection image are collaboratively formed as the object projection image. The airflow sensor is disposed on the top surface of the touchpad device. The airflow sensor detects an airflow change according to the hand operation, thereby generating an airflow signal. The controlling unit is connected with the first projecting device, the second projecting device and the airflow sensor. When the controlling unit receives the first optical signal, the second optical signal and the airflow signal, the controlling unit issues a first control signal to the electronic device, issues a second control signal to the first projecting device and issues a third control signal to the second projecting device. The target object is controlled by the application program according to the first control signal. Moreover, the object projection image is moved according to the second control signal and the third control signal.

From the above descriptions, the present invention provides the input system with the electronic device and the touchpad device. According to the target object of the electronic device, the object projection image of the target object is projected out. Consequently, the user may directly manipulate the object projection image with the hand. Meanwhile, the motions of the hand along different directions are respectively detected by the first projecting device, the second projecting device and the airflow sensor. Consequently, the first optical signal, the second optical signal and the airflow signal are respectively generated. According to the first optical signal, the second optical signal and the airflow signal, the controlling units issue different control signals to the electronic device, the first projecting device and the second projecting device. Consequently, the moved projection images produced by the first projecting device and the second projecting device are collaboratively formed as the moved object projection image. Correspondingly, the target object shown on the electronic device is synchronously moved or rotated with the object projection image. In other words, the input system of the present invention provides a three-dimensional operating environment for allowing the user to directly manipulate the object projection image with the hand. Since the input system of the present invention can be operated by the user more intuitively, the user-friendliness of the input system is enhanced.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For obviating the drawbacks of the prior art technologies, the present invention provides an easy-to-use input system.

Figure 1:
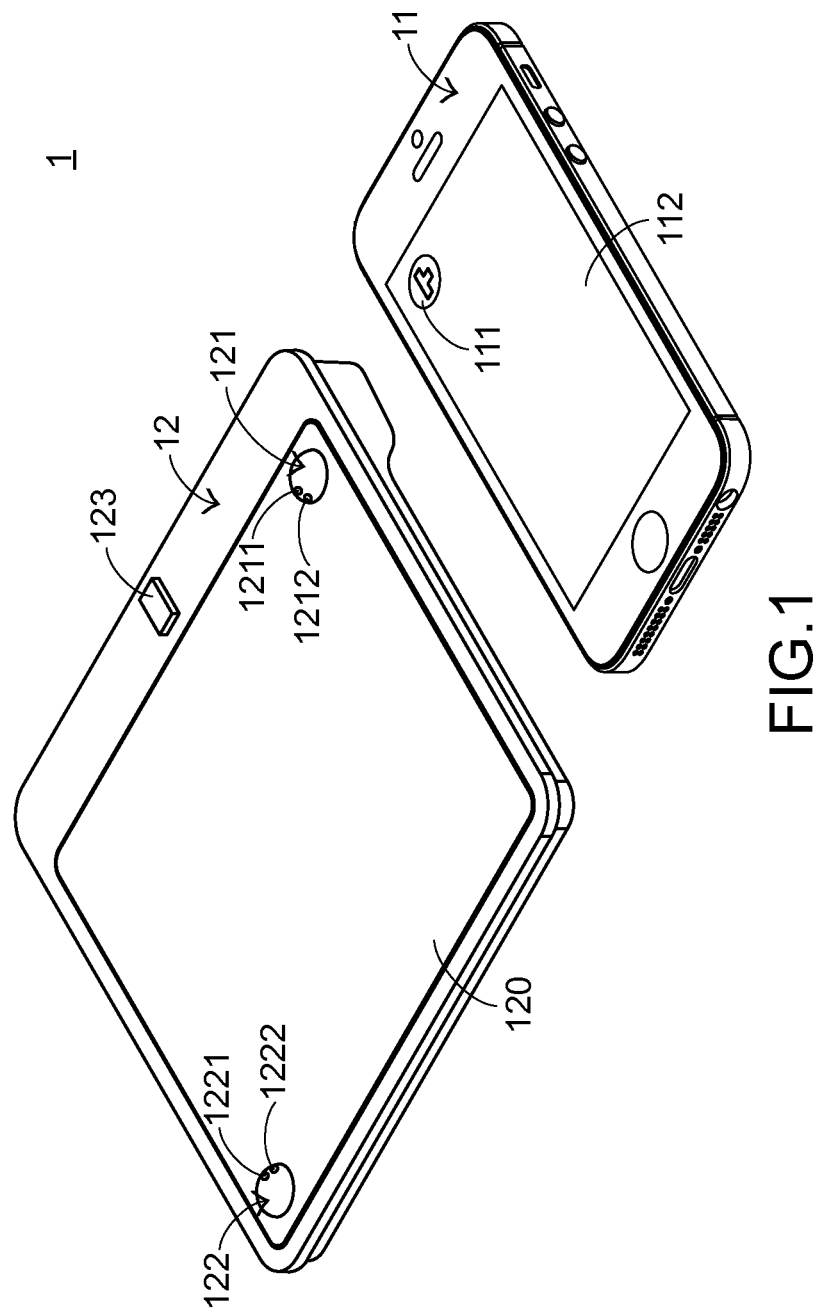
FIG. 1 is a schematic perspective view illustrating the outer appearance of an input system according to an embodiment of the present invention.
Figure 2:
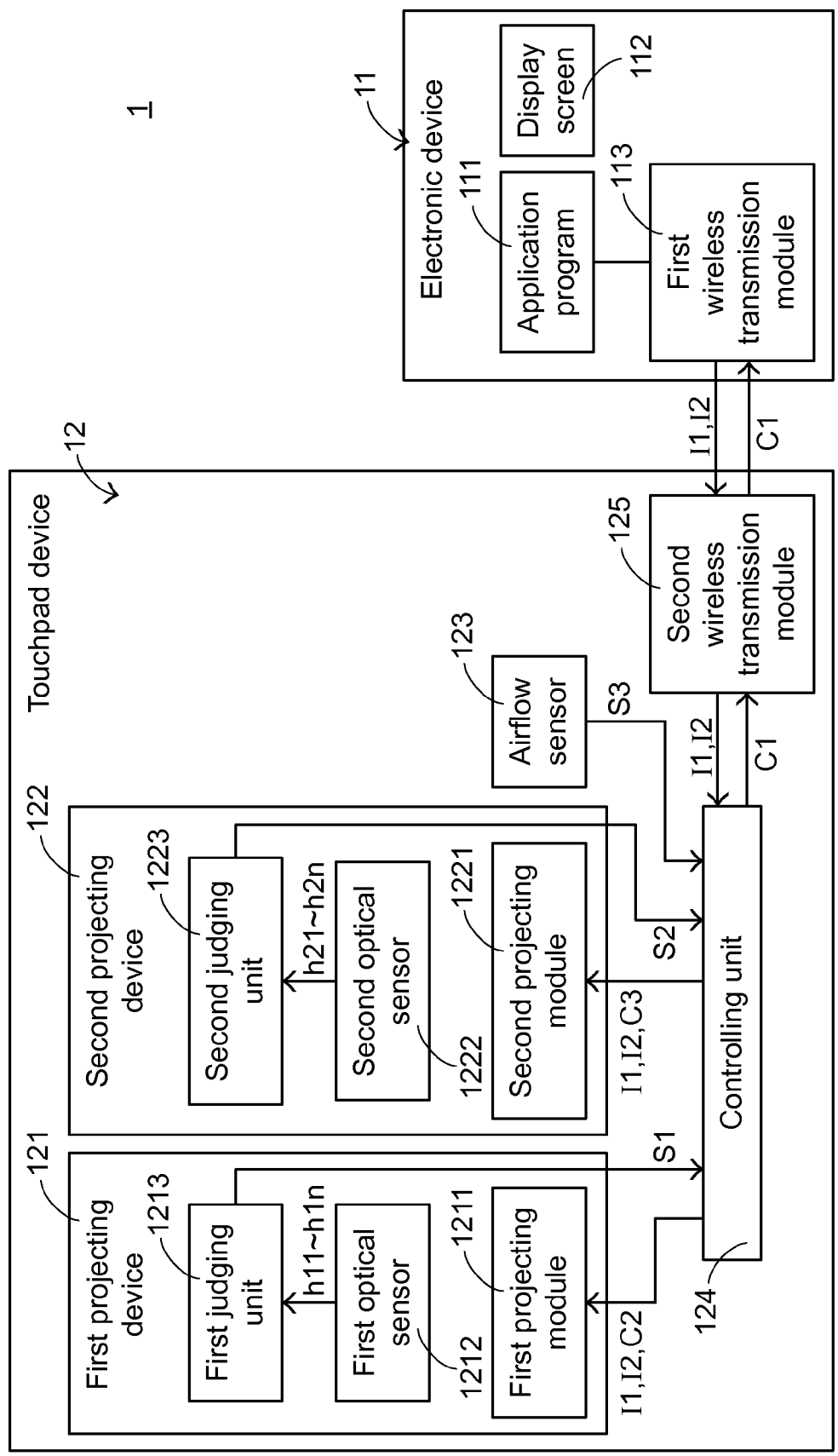
FIG. 2 is a schematic functional block diagram illustrating the input system according to the embodiment of the present invention.

Hereinafter, the structures of an input system of the present invention will be illustrated with reference to FIGS. 1 and 2. FIG. 1 is a schematic perspective view illustrating the outer appearance of an input system according to an embodiment of the present invention. FIG. 2 is a schematic functional block diagram illustrating the input system according to the embodiment of the present invention. As shown in FIGS. 1 and 2, the input system 1 comprises an electronic device 11 and a touchpad device 12. The electronic device 11 comprises an application program 111, a display screen 112 and a first wireless transmission module 113. The application program 111 is installed in the electronic device 11. According to the operations of the electronic device 11, different images may be displayed on the display screen 112. For example, if the application program 111 is not activated, a shortcut icon corresponding to the application program 111 is displayed on the display screen 112. Whereas, when the application program 111 is activated, a target object (not shown) is displayed on the display screen 112. Moreover, when the target object is displayed on the display screen 112, the electronic device 11 generates a spatial information. The first wireless transmission module 113 is disposed within the electronic device 11 for providing a wireless transmission function. In this embodiment, the electronic device 11 is a smart phone. It is noted that the type of the electronic device 11 is not limited. For example, in another embodiment, the electronic device 11 is a desktop computer, a notebook computer or a personal digital assistant (PDA).

Please refer to FIGS. 1 and 2. The touchpad device 12 is connected with the electronic device 11. In addition to the touch input function similar to the conventional touchpad device, the touchpad device 12 of this embodiment further has the function of receiving the spatial information of the target object and generating an object projection image of the target object. The touchpad device 12 comprises a first projecting device 121, a second projecting device 122, an airflow sensor 123, a controlling unit 124 and a second wireless transmission module 125. The first projecting device 121 is disposed on a top surface 120 of the touchpad device 12 and located at a first side of the touchpad device 12. The first projecting device 121 has two functions. In accordance with the first function, the first projecting device 121 generates a first projection image according to the spatial information generated by the electronic device 11. In accordance with the second function, the first projecting device 121 generates a first optical signal S1 according to a hand operation of the user on the object projection image. In this embodiment, the first projecting device 121 comprises a first projecting module 1211, a first optical sensor 1212 and a first judging unit 1213. The first projecting module 1211 is connected with the controlling unit 124 for generating the first projection image according to the spatial information (i.e. the above first function of the first projecting device 121). The above second function of the first projecting device 121 is implemented by the first optical sensor 1212 and the first judging unit 1213 collaboratively. The first optical sensor 1212 is used for capturing plural first hand images h11~h1n of a hand H of a user along a first direction D1 (see FIG. 5). The first judging unit 1213 is connected with the first optical sensor 1212 and the controlling unit 124. After the plural first hand images h11~h1n are received, the first judging unit 1213 judges whether the plural first hand images h11~h1n are different. If the first judging unit 1213 judges that the plural first hand images h11~h1n are different, the first judging unit 1213 issues the first optical signal S1 to the controlling unit 124.

The second projecting device 122 is disposed on the top surface 120 of the touchpad device 12 and located at a second side of the touchpad device 12. Preferably, as shown in FIG. 1, the second projecting device 122 and the first projecting device 121 are arranged along a diagonal line of the touchpad device 12. It is noted that the locations of the first projecting device 121 and the second projecting device 122 are not restricted. The second projecting device 122 has two functions. In accordance with the first function, the second projecting device 122 generates a second projection image according to the spatial information generated by the electronic device 11. In accordance with the second function, the second projecting device 122 generates a second optical signal S2 according to the hand operation of the user on the object projection image. In this embodiment, the second projecting device 122 comprises a second projecting module 1221, a second optical sensor 1222 and a second judging unit 1223. The second projecting module 1221 is connected with the controlling unit 124 for generating the second projection image according to the spatial information. The above second function of the second projecting device 122 is implemented by the second optical sensor 1222 and the second judging unit 1223 collaboratively. The second optical sensor 1222 is used for capturing plural second hand images h21~h2n of the hand H of the user along a second direction D2 (see FIG. 5). The second judging unit 1223 is connected with the second optical sensor 1222 and the controlling unit 124. After the plural second hand images h21~h2n are received, the second judging unit 1223 judges whether the plural second hand images h21~h2n are different. If the second judging unit 1223 judges that the plural second hand images h21~h2n are different, the second judging unit 1223 issues the second optical signal S2 to the controlling unit 124. The second direction D2 is perpendicular to the first direction D1. In this embodiment, the first projecting module 1211 and the second projecting module 1221 are both projectors, and the first optical sensor 1212 and the second optical sensor 1222 are both charge coupled devices (CCD) or complementary metal-oxide semiconductors (CMOS).

The airflow sensor 123 is disposed on the top surface 120 of the touchpad device 12. The airflow sensor 123 is used for detecting an airflow change according to the hand operation of the user along a third direction D3 (see FIG. 5), thereby generating an airflow signal S3 to the controlling unit 124. The third direction D3 is perpendicular to the first direction D1 and the second direction D2.

The controlling unit 124 is disposed within the touchpad device 12, and connected with the first projecting device 121, the second projecting device 122 and the airflow sensor 123. The controlling unit 124 has three functions. In accordance with the first function, when the spatial information from the electronic device 11 is received by the controlling unit 124, the spatial information is transmitted from the controlling unit 124 to the first projecting device 121 and the second projecting device 122. In accordance with the second function, when the first optical signal, the second optical signal and the airflow signal are received, the controlling unit 124 issues a corresponding first control signal to the electronic device 11. According to the first control signal, the target object is correspondingly controlled by the application program 111. For example, the target object is moved or the target object is rotated according to the first control signal. In accordance with the third function, when the first optical signal, the second optical signal and the airflow signal are received, the controlling unit 124 issues a corresponding second control signal to the first projecting device 121 and issues a corresponding third control signal to the second projecting device 122. According to the second control signal and the third control signal, the object projection image is correspondingly moved or rotated.

The second wireless transmission module 125 is disposed within the touchpad device 12 and connected with the controlling unit 124. The second wireless transmission module 125 is in wireless communication with the first wireless transmission module 113 according to a wireless communication technology. Consequently, the wireless connection between the electronic device 11 and the touchpad device 12 is established to achieve the transmission of the above spatial information and the first control signal. In this embodiment, both of the first wireless transmission module 113 and the second wireless transmission module 125 are Bluetooth transmission modules. It is noted that the types of the first wireless transmission module 113 and the second wireless transmission module 125 are not limited. For example, in another embodiment, the first wireless transmission module and the second wireless transmission module are in wireless communication with each other according to a near field communication (NFC) or any other appropriate wireless transmission technology.

Figure 3:
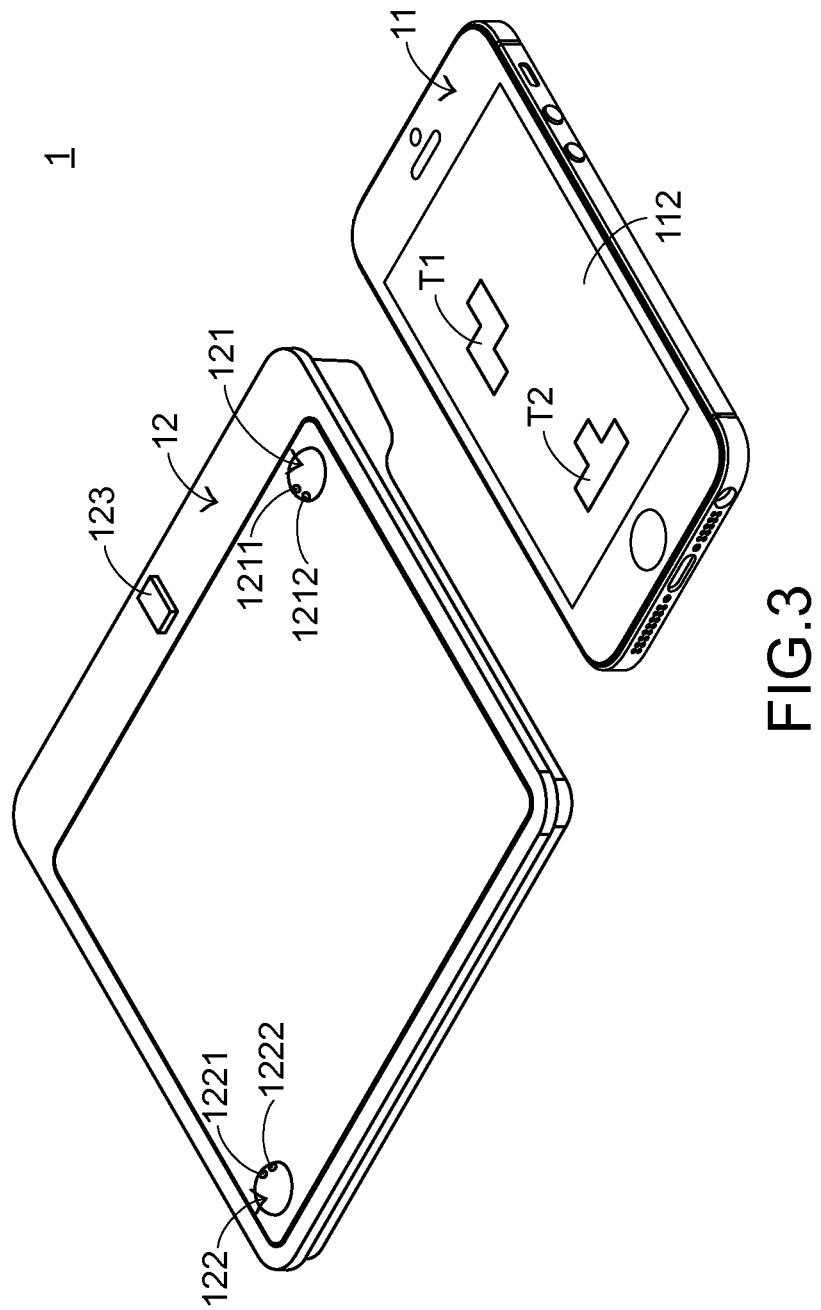
FIG. 3 schematically illustrates a first target object and a second target object shown on the display screen of the electronic device of the input system according to the embodiment of the present invention.

Hereinafter, the operations of the input system 1 will be illustrated with reference to FIGS. 1, 2 and 3. FIG. 3 schematically illustrates a first target object and a second target object shown on the display screen of the electronic device of the input system according to the embodiment of the present invention. Firstly, the wireless connection between the electronic device 11 and the touchpad device 12 is established through the first wireless transmission module 113 and the second wireless transmission module 125. Then, the application program 111 is activated. Consequently, as shown in FIG. 3, a first target object T1 and a second target object T2 are displayed on the display screen 112. For example, the application program 111 may be activated by directly touching the icon corresponding to the application program 111. Alternatively, the application program 111 may be activated by triggering the application program 111 through the touchpad device 12. While the first target object T1 and the second target object T2 are displayed on the display screen 112, the electronic device 11 generates a first spatial information I1 of the first target object T1 and a second spatial information I2 of the second target object T2, and the first spatial information I1 and the second spatial information I2 are transmitted to the controlling unit 124 through the first wireless transmission module 113 and the second wireless transmission module 125. In this embodiment, the first target object T1 and the second target object T2 provided by the application program 111 are two-dimensional objects. Consequently, the first spatial information I1 contains a length information and a width information of the first target object T1, and the second spatial information I2 contains a length information and a width information of the second target object T2.

Figure 4:
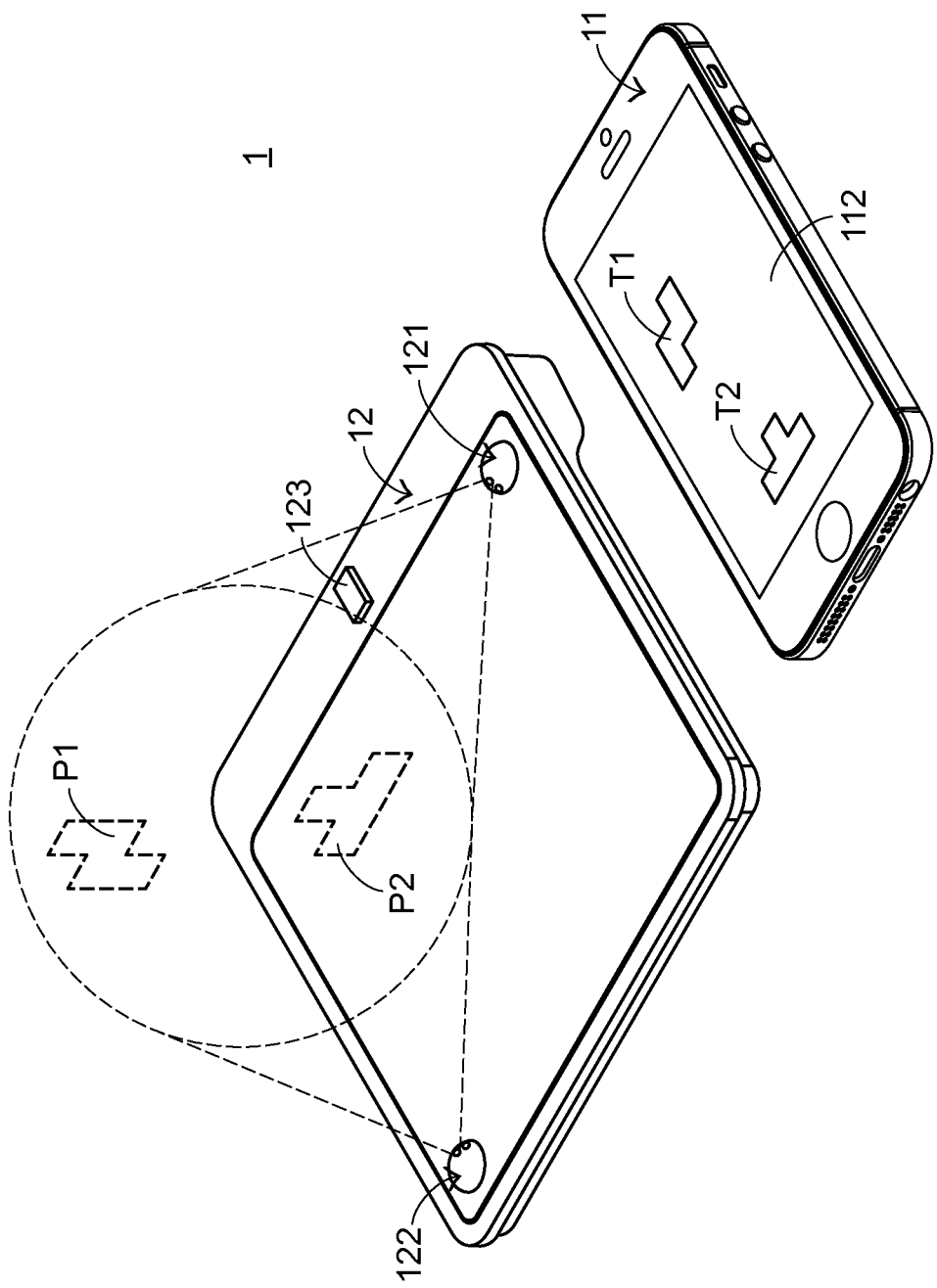
FIG. 4 schematically illustrates a first object projection image and a second object projection image generated by the input system according to the embodiment of the present invention.

FIG. 4 schematically illustrates a first object projection image and a second object projection image generated by the input system according to the embodiment of the present invention. Please refer to FIGS. 1~4. After the first spatial information I1 and the second spatial information I2 are transmitted to the controlling unit 124, the first spatial information I1 and the second spatial information I2 are transmitted to both of the first projecting device 121 and the second projecting device 122, respectively. After the first spatial information I1 and the second spatial information I2 are read by the first projecting module 1211 of the first projecting device 121, a first projection image corresponding to the first target object T1 and a third projection image corresponding to the second target object T2 are generated by the first projecting device 121 according to a projection technology. After the first spatial information I1 and the second spatial information I2 are read by the second projecting module 1221 of the second projecting device 122, a second projection image corresponding to the first target object T1 and a fourth projection image corresponding to the second target object T2 are generated by the second projecting device 122 according to the projection technology.

The first projection image is a first surface image of the first target object T1, and the second projection image is a second surface image of the first target object T1. Consequently, the first projection image and the second projection image corresponding to the same location are collaboratively formed as a first object projection image P1 of the first target object T1. The first object projection image P1 is a two-dimensional image. Similarly, the third projection image is a first surface image of the second target object T2, and the fourth projection image is a second surface image of the second target object T2. Consequently, the third projection image and the fourth projection image corresponding to the same location are collaboratively formed as a second object projection image P2 of the second target object T2. The second object projection image P2 is also a two-dimensional image.

Figure 5:
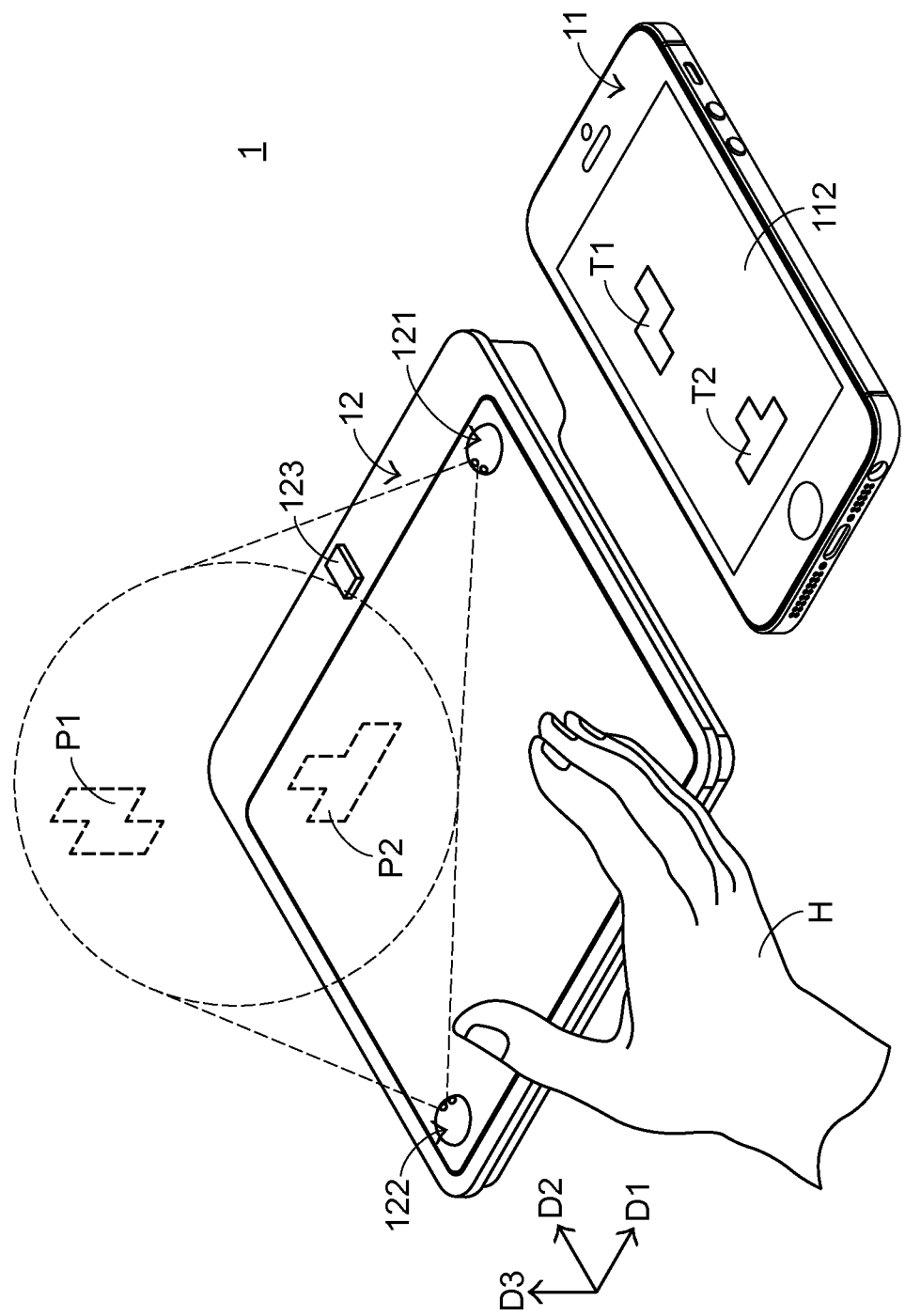
FIG. 5 schematically illustrates the concept of detecting the hand operation by the touchpad device of the input system according to the embodiment of the present invention.

FIG. 5 schematically illustrates the concept of detecting the hand operation by the touchpad device of the input system according to the embodiment of the present invention. Please refer to FIGS. 2 and 5. After the first object projection image P1 and the second object projection image P2 are formed over the touchpad device 12, the first object projection image P1 may be controlled by the hand H of the user according to the following procedures. For example, the user may intuitively grasp the first object projection image P1 with the hand H and rotate and/or move the first object projection image P1 with the hand H. Meanwhile, the plural first hand images h11~h1$n$ of the hand H of the user along the first direction D1 are captured by the first optical sensor 1212 of the first projecting device 121. In addition, if the first judging unit 1213 connected with the first optical sensor 1212 judges that the plural first hand images h11~h1$n$ are different, it means that the motion of the hand H is subjected to a change and relevant to a moving trajectory along the first direction D1. Under this circumstance, a first optical signal S1 corresponding to the moving trajectory along the first direction D1 is generated by the first judging unit 1213 and transmitted to the controlling unit 124.

At the same time, the plural second hand images h21~h2$n$ of the hand H of the user along the second direction D2 are captured by the second optical sensor 1222 of the second projecting device 122. In addition, if the second judging unit 1223 connected with the second optical sensor 1222 judges that the plural second hand images h21~h2$n$ are different, it means that the motion of the hand H is subjected to a change and relevant to a moving trajectory along the second direction D2. Under this circumstance, a second optical signal S2 corresponding to the moving trajectory along the second direction D2 is generated by the second judging unit 1223 and transmitted to the controlling unit 124.

Figure 6:
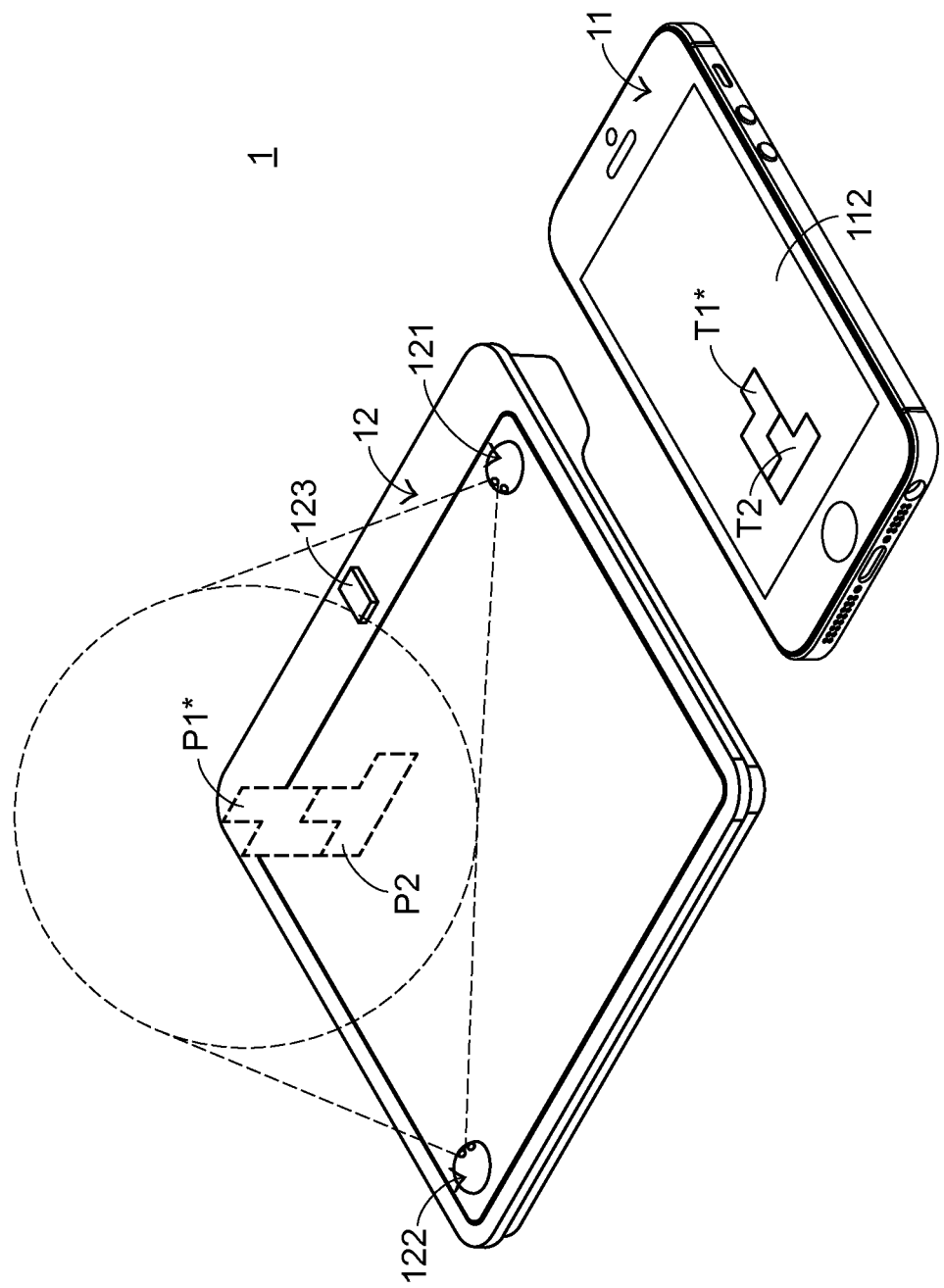
FIG. 6 schematically illustrates the moved first object projection image and the second object projection image generated by the input system according to the embodiment of the present invention.

On the other hand, if the airflow sensor 123 detects an airflow change corresponding to the movement of the hand H along the third direction D3, the airflow sensor 123 issues the airflow signal S3 to the controlling unit 124. After the first optical signal S1, the second optical signal S2 and the airflow signal S3 are received by the controlling unit 124, a first control signal C1 corresponding to the moving trajectory of the hand H is transmitted from the controlling unit 124 to the electronic device 11 and a second control signal C2 corresponding to the moving trajectory of the hand H is transmitted from the controlling unit 124 to the first projecting module 1211 according to these signals. When the second control signal C2 is received by the first projecting module 1211, the first projecting module 1211 generates the moved first projection image. At the same time, a third control signal C3 corresponding to the moving trajectory of the hand H is transmitted from the controlling unit 124 to the second projecting module 1221. When the third control signal C3 is received by the second projecting module 1221, the second projecting module 1221 generates a moved second projection image. The moved first projection image and the moved second projection image are collaboratively formed as a moved first object projection image P1*. According to the hand operation of the user, the moved first object projection image P1* is located over and stacked on the second object projection image P2 (see FIG. 6).

Moreover, when the first control signal C1 is received by the electronic device 11, the first target object T1 is moved according to the first control signal C1 corresponding to the moving trajectory of the hand H. Consequently, the moved first target object T1* is stacked on the second target object T2. In other words, the input system 1 of the present invention may generate the first object projection image P1 corresponding to the first target object T1. The user may directly manipulate the first object projection image P1 to control the movement or rotation of the first object projection image P1. Correspondingly, the first target object T1 shown on the electronic device 11 is synchronously moved or rotated with the first object projection image P1.

The following three aspects should be specially described. Firstly, in this embodiment, the touchpad device 12 is in wireless communication with the electronic device according to the wireless transmission technology. In another embodiment, the touchpad device has a physical connecting wire. After the physical connecting wire is plugged into the electronic device, the connection between the touchpad device and the electronic device is established. Secondly, in this embodiment, the first target object T1 and the second target object T2 provided by the application program 111 are two-dimensional objects. It is noted that the first target object and the second target object are not restricted to the two-dimensional object. In case that the application program is changed, the target object may be correspondingly the three-dimensional object. Under this circumstance, the object projection image of the target object is a three-dimensional image. Consequently, the spatial information of the target object contains the length information, the width information and the height information of the target object. Thirdly, while the first object projection image P1 and the second object projection image P2 are formed, the plural images near the first optical sensor 1212 and the second optical sensor 1222 are continuously captured by the first optical sensor 1212 and the second optical sensor 1222. In these images, the images containing the image of the hand H are defined as the first hand images and the second hand images. Take the plural first hand images as examples. If the first judging unit 1213 judges that the plural first hand images h11~h1n are identical, it means that the hand H of the user is not moved or rotated. Under this circumstance, the first judging unit 1213 does not generate the second control signal C2, and the first judging unit 1213 continuously judges whether the plural first hand images are different. The operations of the second judging unit 1223 are similar to those of the first judging unit 1213, and are not redundantly described herein.

From the above descriptions, the present invention provides the input system with the electronic device and the touchpad device. According to the target object of the electronic device, the object projection image of the target object is projected out. Consequently, the user may directly manipulate the object projection image with the hand. Meanwhile, the motions of the hand along different directions are respectively detected by the first projecting device, the second projecting device and the airflow sensor. Consequently, the first optical signal, the second optical signal and the airflow signal are respectively generated. According to the first optical signal, the second optical signal and the airflow signal, the controlling units issue different control signals to the electronic device, the first projecting device and the second projecting device. Consequently, the moved projection images produced by the first projecting device and the second projecting device are collaboratively formed as the moved object projection image. Correspondingly, the target object shown on the electronic device is synchronously moved or rotated with the object projection image. In other words, the input system of the present invention provides a three-dimensional operating environment for allowing the user to directly manipulate the object projection image with the hand. Since the input system of the present invention can be operated by the user more intuitively, the user-friendliness of the input system is enhanced.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An input system, comprising:
an electronic device, wherein an application program is installed in the electronic device, wherein when the application program is activated, a target object is displayed on a display screen of the electronic device, wherein the electronic device generates a spatial information of the target object; and
a touchpad device connected with the electronic device, and receiving the spatial information of the target object, wherein the touchpad device generates an object projection image of the target object according to the spatial information, wherein the touchpad device comprises:
a first projecting device disposed on a top surface of the touchpad device and located at a first side of the touchpad device, wherein the first projecting device generates a first projection image according to the spatial information, and the first projecting device generates a first optical signal according to a hand operation of a user on the object projection image;
a second projecting device disposed on the top surface of the touchpad device and located at a second side of the touchpad device, wherein the second projecting device generates a second projection image according to the spatial information, and the second projecting device generates a second optical signal according to the hand operation, wherein the first projection image and the second projection image are collaboratively formed as the object projection image;
an airflow sensor disposed on the top surface of the touchpad device, wherein the airflow sensor detects an airflow change according to the hand operation, thereby generating an airflow signal; and a controlling unit connected with the first projecting device, the second projecting device and the airflow sensor, wherein when the controlling unit receives the first optical signal, the second optical signal and the airflow signal, the controlling unit issues a first control signal to the electronic device, issues a second control signal to the first projecting device and issues a third control signal to the second projecting device, wherein the target object is controlled by the application program according to the first control signal, and the object projection image is moved according to the second control signal and the third control signal.

2. The input system according to claim 1, wherein the first projecting device comprises:

a first projecting module connected with the controlling unit and generating the first projection image according to the spatial information;

a first optical sensor capturing plural first hand images of a hand of the user along a first direction; and a first judging unit connected with the first optical sensor and the controlling unit and judging whether the plural first hand images are different, wherein if the first judging unit judges that the plural first hand images are different, the first judging unit issues the first optical signal to the controlling unit, wherein the second projecting device comprises:

a second projecting module connected with the controlling unit and generating the second projection image according to the spatial information;

a second optical sensor capturing plural second hand images of the hand of the user along a second direction; and a second judging unit connected with the second optical sensor and the controlling unit and judging whether the plural second hand images are different, wherein if the second judging unit judges that the plural second hand images are different, the second judging unit issues the second optical signal to the controlling unit, wherein the second direction is perpendicular to the first direction.

3. The input system according to claim 2, wherein if the first judging unit judges that the plural first hand images are identical, the first judging unit does not issue the first optical signal to the controlling unit, wherein if the second judging unit judges that the plural second hand images are identical, the second judging unit does not issue the second optical signal to the controlling unit.

4. The input system according to claim 2, wherein if the airflow sensor detects the airflow change according to the hand operation along a third direction, the airflow sensor issues the airflow signal to the controlling unit, wherein according to the first optical signal, the second optical signal and the airflow signal, the controlling unit issues the first control signal to the electronic device, issues the second control signal to the first projecting device and issues the third control signal to the second projecting device, wherein when the second control signal is received by the first projecting device, the first projecting module generates the moved first projection image, wherein when the third control signal is received by the second projecting device, the second projecting module generates the moved second projection image, wherein the moved first projection image and the moved second projection image are collaboratively formed as the moved object projection image, wherein the third direction is perpendicular to the first direction and the second direction.

5. The input system according to claim 2, wherein the first projecting module and the second projecting module are projectors, and the first optical sensor and the second optical sensor are charge coupled devices (CCD) or complementary metal-oxide semiconductors (CMOS).

6. The input system according to claim 1, wherein the electronic device further comprises a first wireless transmission module, and the touchpad device further comprises a second wireless transmission module, wherein the second wireless transmission module is connected with the controlling unit and in wireless communication with the first wireless transmission module of the electronic device according to a wireless transmission technology, so that the first control signal is transmitted to the electronic device.

7. The input system according to claim 1, wherein the first wireless transmission module and the second wireless transmission module are Bluetooth transmission modules.

8. The input system according to claim 1, wherein after the spatial information from the electronic device is received by the controlling unit, the spatial information is transmitted to the first projecting device and the second projecting device, wherein according to the spatial information, the first projection image and the second projection image are respectively generated by the first projecting device and the second projecting device, so that the object projection image is formed.

9. The input system according to claim 1, wherein if the target object provided by the application program is a three-dimensional object, the object projection image is a three-dimensional image, and the spatial information contains a length information, a width information and a height information of the target object.

10. The input system according to claim 1, wherein if the target object provided by the application program is a two-dimensional object, the object projection image is a two-dimensional image, and the spatial information contains a length information and a width information of the target object.

* * * * *